(12) United States Patent
Kim

(10) Patent No.: US 9,360,105 B2
(45) Date of Patent: Jun. 7, 2016

(54) ORGAN TYPE ELECTRONIC SHIFT LEVER

(71) Applicant: Hyundai Motor Company, Seoul (KR)

(72) Inventor: Eun-Sik Kim, Kwangmyong-shi (KR)

(73) Assignee: Hyundai Motor Company, Seoul (KR)

( * ) Notice: Subject to any disclaimer, the term of this patent is extended or adjusted under 35 U.S.C. 154(b) by 145 days.

(21) Appl. No.: 14/335,643

(22) Filed: Jul. 18, 2014

(65) Prior Publication Data

US 2015/0040709 A1    Feb. 12, 2015

(30) Foreign Application Priority Data

Aug. 6, 2013    (KR) .......................... 10-2013-0092893

(51) Int. Cl.
| F16H 59/08 | (2006.01) |
| F16H 59/10 | (2006.01) |
| F16H 59/02 | (2006.01) |
| F16H 61/24 | (2006.01) |

(52) U.S. Cl.
CPC .............. *F16H 59/105* (2013.01); *F16H 59/08* (2013.01); *B60K 2741/04* (2013.01); *B60K 2741/045* (2013.01); *F16H 59/10* (2013.01); *F16H 2059/0291* (2013.01); *F16H 2061/241* (2013.01); *F16H 2306/00* (2013.01); *Y10T 74/2014* (2015.01)

(58) Field of Classification Search
CPC ....... F16H 59/10; F16H 59/105; F16H 59/08; B60K 2741/04; B60K 2741/045
USPC .................. 477/107, 209; 340/456; 74/473.1, 74/473.12, 473.13, 473.3, 473 XY
See application file for complete search history.

(56) References Cited

U.S. PATENT DOCUMENTS

| 4,527,913 | A  | * | 7/1985  | Seifert ................... B60K 20/02 384/215 |
| 5,142,928 | A  | * | 9/1992  | Buti ....................... B60K 20/02 74/335 |
| 6,694,838 | B2 | * | 2/2004  | Ersoy ....................... B60R 25/24 74/473.1 |
| 7,163,072 | B2 |   | 1/2007  | Yamaguchi |
| 9,212,739 | B2 | * | 12/2015 | Kim ..................... F16H 59/0278 |
| 2004/0182191 | A1 | * | 9/2004  | Kondo ................. F16H 59/0278 74/473.3 |
| 2006/0283276 | A1 | * | 12/2006 | Komatsu ............... F16H 59/105 74/335 |

FOREIGN PATENT DOCUMENTS

| KR | 1020130040343 A | 4/2013 |
| KR | 1020130063830 A | 6/2013 |

* cited by examiner

*Primary Examiner* — Roger Pang
(74) *Attorney, Agent, or Firm* — Morgan, Lewis & Bockius LLP

(57) ABSTRACT

Disposed is an organ type electronic shift lever formed on a console surface at a periphery of a driver seat in a vehicle. The electronic shift lever may include a step motor coupled to the console surface and having both ends to which motor rotation shafts are connected, a pair of lever arms each having one end rotatably coupled to one or each of the motor rotation shafts, a pair of lever pins each rotatably coupled to the other end of one or each of the lever arms, a shift lever having side portions rotatably connected to the lever arms by the lever pins and a rear end to which a magnetic unit is coupled, a display unit formed on the shift lever, and a recognition sensor formed in the console surface and sensing a position of the magnetic unit. When the shift lever is moved forward or rearward while forming an inclination angle with the console surface, a gear shift stage of the vehicle is changed.

9 Claims, 5 Drawing Sheets

ORGAN TYPE ELECTRONIC SHIFT LEVER

CROSS-REFERENCE TO RELATED APPLICATIONS

The present application claims priority of Korean Patent Application Number 10-2013-0092893 filed on Aug. 6, 2013, the entire contents of which application are incorporated herein for all purposes by this reference.

BACKGROUND OF INVENTION

1. Field of Invention

The present invention relates to an electronic shift lever formed on a console surface of a vehicle, and more particularly, to an organ type electronic shift lever in which a gear shift stage of a vehicle is changed when a shift lever connected to a step motor by a lever arm is moved forward and rearward while forming an inclination angle with a console surface.

2. Description of Related Art

A transmission is an apparatus that transmits power of an engine to drive wheels while changing rotational force and speed depending on a driving state of a vehicle, and classified into a manual transmission and an automatic transmission. Regarding the manual transmission and the automatic transmission, the driver in the vehicle may select a desired state using a shift lever.

In the manual transmission, when the driver selects a gear, which is suitable for a driving state of the vehicle, using the shift lever, this selection is transmitted to the manual transmission through a cable or a rod so that the driver may drive the vehicle in a desired manner. In the automatic transmission, the driver drives an inhibitor switch through a cable by moving the shift lever so as to transmit desired movement to the automatic transmission.

Particularly, recently, usage of an electronic shift lever, which allows for electronic gear shift control that uses an actuator and an ECU for electrically operating a mechanical connection structure between the transmission and the shift lever instead of a mechanical shift lever, is increased.

The electronic shift lever requires no mechanical cable connection structure unlike the mechanical shift lever, and needs to have a position sensor unit that converts the driver's intention of shifting gears into an electronic signal, but there are advantages in that the driver may efficiently and conveniently manipulate the shift lever.

However, as illustrated in FIG. 1A, an electronic shift lever in the related art is manipulated by manipulating forward and rearward a shift lever 2 that protrudes on a console surface 1 of a vehicle, and this manipulation manner is similar to the manipulation manner of the mechanical shift lever, and there is no great advantage of only the electronic shift lever in comparison with the mechanical shift lever.

That is, since the shift lever 2 protrudes on the console surface 1 of the vehicle, there are problems in that the driver's head may collide with the protruding shift lever 2 at the time of a vehicle accident, which may cause severe injury to the driver, and aesthetic appearance deteriorates in terms of interior design.

Since the electronic shift lever in the related art occupies a larger space, there are problems in that a space for accommodating a cup holder and the like or a space for performing functions of buttons required to drive the vehicle is insufficient at the periphery of the shift lever.

Since in the electronic shift lever in the related art, a gear shift stage display unit needs to be accommodated at a handle portion of the shift lever that protrudes on the console of the vehicle, the gear shift stage display unit is inevitably formed to have a small size, and as a result, there are problems in that a text size on the gear shift stage display unit is small, and thus it is difficult for the driver to recognize information on the gear shift stage.

As illustrated in FIG. 1B, in the electronic shift lever in the related art, when the driver in the vehicle changes the gear shift stage from a P-stage to an R-stage, an N-stage, or a D-stage, the arm of the driver is ergonomically directed downward gradually, but all manipulation heights of the electronic shift lever are nearly similar to each other, and as a result, there is a problem in that it is inconvenient for the driver to change the gear shift stage of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an organ type electronic shift lever which is configured so that a shift lever connected to a step motor by a lever arm is moved forward and rearward while forming a predetermined inclination angle with a console surface, and a recognition sensor recognizes a position of a magnetic unit coupled to a rear end of the shift lever so as to change a gear shift stage of a vehicle, thereby reducing a risk of injury to a driver at the time of a vehicle accident, and matching manipulation heights of the shift lever to an ergonomic manipulation trajectory of the driver.

Various aspects of the present invention provide an organ type electronic shift lever which is formed on a console surface disposed at a periphery of a driver seat in a vehicle, the electronic shift lever including: a step motor which is coupled to the console surface and has both ends to which motor rotation shafts are connected; a pair of lever arms each of which has one end coupled to one or each of the motor rotation shafts so that the pair of lever arms is rotatable about the motor rotation shafts; a pair of lever pins each of which is rotatably coupled to the other end of one or each of the lever arms; a shift lever which has side portions rotatably connected to the lever arms by the lever pins, and a rear end to which a magnetic unit is coupled; a display unit which is formed on one surface of the shift lever; and a recognition sensor which is formed in the console surface in a longitudinal direction thereof, and senses a position of the magnetic unit, in which when the shift lever is moved forward or rearward while forming an inclination angle with respect to the console surface, a gear shift stage of the vehicle is changed.

The inclination angle formed between the shift lever and the console surface may include a P-stage inclination angle which is an inclination angle formed between the shift lever and the console surface when the gear shift stage of the vehicle is a P-stage, an R-stage inclination angle which is an inclination angle formed between the shift lever and the console surface when the gear shift stage of the vehicle is an R-stage, an N-stage inclination angle which is an inclination angle formed between the shift lever and the console surface when the gear shift stage of the vehicle is an N-stage, and a D-stage inclination angle which is an inclination angle formed between the shift lever and the console surface when the gear shift stage of the vehicle is a D-stage, in which the R-stage inclination angle is smaller than the P-stage inclination angle, the N-stage inclination angle is smaller than the R-stage inclination angle, and the D-stage inclination angle is smaller than the N-stage inclination angle.

When an engine of the vehicle is started, the shift lever may be moved forward by rotation of the motor rotation shafts connected to the step motor while forming the P-stage inclination angle with respect to the console surface.

The organ type electronic shift lever according to the present invention may further include an engine off stage inclination angle when the shift lever is moved rearward by a predetermined length and disposed in parallel with the console surface, in which when the shift lever maintains the engine off stage inclination angle with respect to the console surface for a predetermined time, the engine of the vehicle is turned off.

When the inclination angle is changed to the engine off stage inclination angle in a state in which the shift lever forms the P-stage inclination angle or the N-stage inclination angle with respect to the console surface, and the engine off stage inclination angle is maintained for the predetermined time, the engine of the vehicle may be turned off, and when the inclination angle is changed to the engine off stage inclination angle in a state in which the shift lever forms the R-stage inclination angle or the D-stage inclination angle with respect to the console surface, the inclination angle may return back to the R-stage inclination angle or the D-stage inclination angle, respectively.

A distance from the lever pin to the rear end of the shift lever may be longer than a distance from the lever pin to a front end of the shift lever.

The step motor may include: a rotor which is disposed at a center of the step motor, connected with the motor rotation shaft, and formed with a permanent magnet; and a stator which is disposed outside the rotor, and has a plurality of protruded portions that protrudes in a direction toward the center of the step motor, and when the shift lever is moved and the motor rotation shafts are rotated, a distance between the rotor and the stator may be varied, such that cogging torque may be generated, and feeling of moderation may be created.

The protruded portions may be formed to have different heights from each other so that the generated cogging torque is different and in accord with the gear shift stage of the vehicle.

The organ type electronic shift lever according to the present invention may further include: rollers which are rotatably coupled to both sides of the rear end of the shift lever; and guides which are formed on the console surface in the longitudinal direction thereof and slidably accommodates the rollers.

According to the present invention, a structure of the shift lever becomes simple in comparison with a structure of an electronic shift lever in the related art, thereby greatly reducing a production cost for the vehicle, and the shift lever does not protrude on the console surface of the vehicle, thereby greatly reducing injury to the driver at the time of a vehicle collision.

The shift lever is moved while forming a predetermined inclination with the console surface such that the ergonomic manipulation trajectory of the driver is matched to the manipulation heights of the electronic shift lever, and as a result, the shift lever may be smoothly manipulated. Further, the display unit formed on one surface of the shift lever is inclined, and a size of the display unit becomes larger, such that the driver may conveniently see the current gear shift stage and a vehicle state through the display unit.

Since the distance from the lever pin to the rear end of the shift lever is longer than the distance from the lever pin to the front end of the shift lever, the shift lever may not be entirely lifted up and may not be rotated, and the rear end of the shift lever may be in contact with the console surface by its own weight.

When the engine of the vehicle is started, the shift lever is popped up by rotation of the motor rotation shaft connected to the step motor, thereby improving marketability of the vehicle. Further, when the driver in the vehicle pops down the shift lever, the engine of the vehicle is turned off, thereby preventing a secondary accident at the time of a vehicle collision.

Heights of the curved portions of the stator in the step motor are formed to be different from each other, thereby implementing different manipulation force of the shift lever depending on the gear shift stage, and allowing the driver to easily recognize a state of the current gear shift stage.

Because a size of the electronic shift lever is smaller than that of the electronic shift lever in the related art, a space capable of accommodating a cup holder and the like may be increased at the periphery of the shift lever, and a luxurious design may be made in terms of interior design of the vehicle, thereby more improving marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1A:
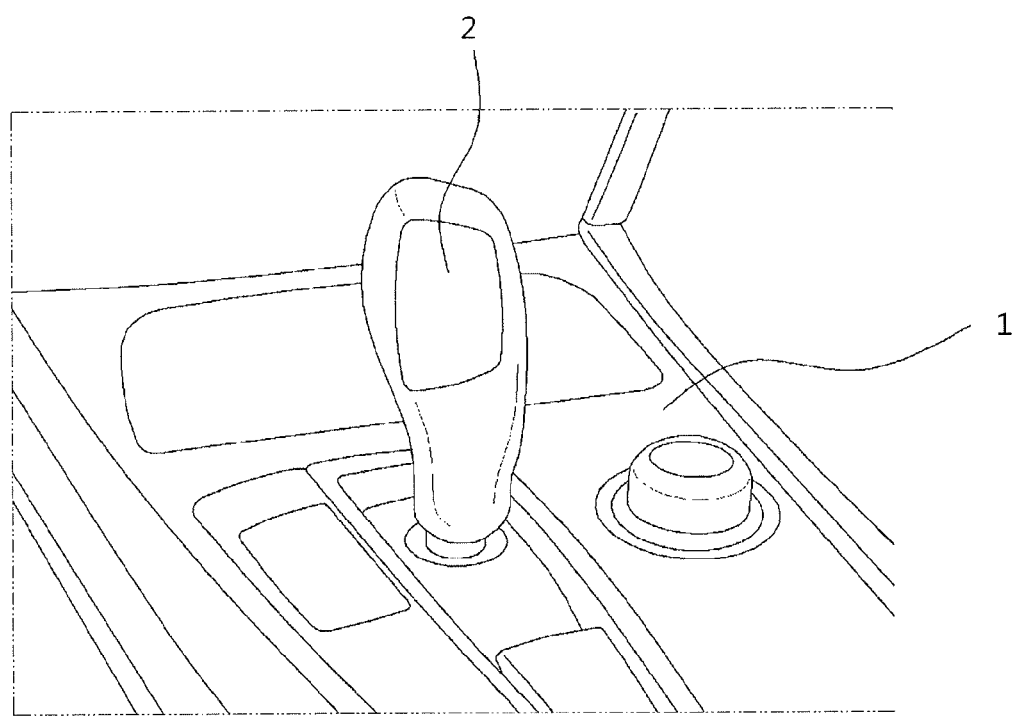
FIG. 1A is a schematic view illustrating an appearance in which an electronic shift lever in the related art is mounted in a vehicle.
Figure 1B:
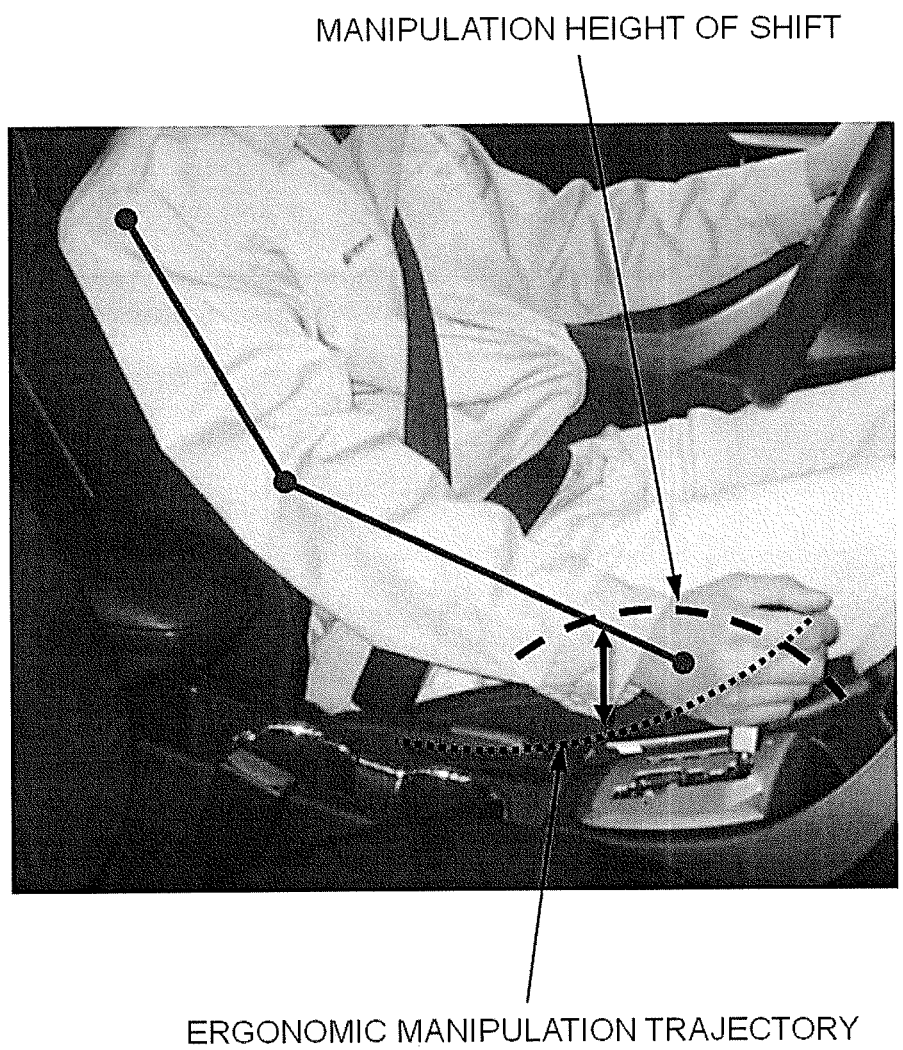
FIG. 1B is a schematic view illustrating a difference between a manipulation height of the shift lever and an ergonomic manipulation trajectory of a driver in accordance with the electronic shift lever in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An organ type electronic shift lever according to the present invention is an electronic shift lever that is formed on a console surface 10 disposed at the periphery of a driver seat of a vehicle, and includes: a step motor 20 which is coupled to the console surface 10 and has both ends to which motor rotation shafts 22 are connected; a pair of lever arms 30 each of which has one end coupled to one or each of the motor rotation shafts 22 so that the pair of lever arms 30 is rotated about the motor rotation shafts 22; a pair of lever pins 32 each of which is rotatably coupled to the other end of one or each of the lever arms 30; a shift lever 40 which has side portions rotatably connected to the lever arms 30 by the lever pins 32 and a rear end to which a magnetic unit 42 is coupled; a display unit 44 which is formed on one surface of the shift lever 40; and a recognition sensor 50 which is formed in the console surface 10 in a longitudinal direction thereof so as to sense a position of the magnetic unit 42, in which when the shift lever 40 is moved forward and rearward while forming an inclination angle with the console surface 10, a gear shift stage of the vehicle is changed.

Figure 2:
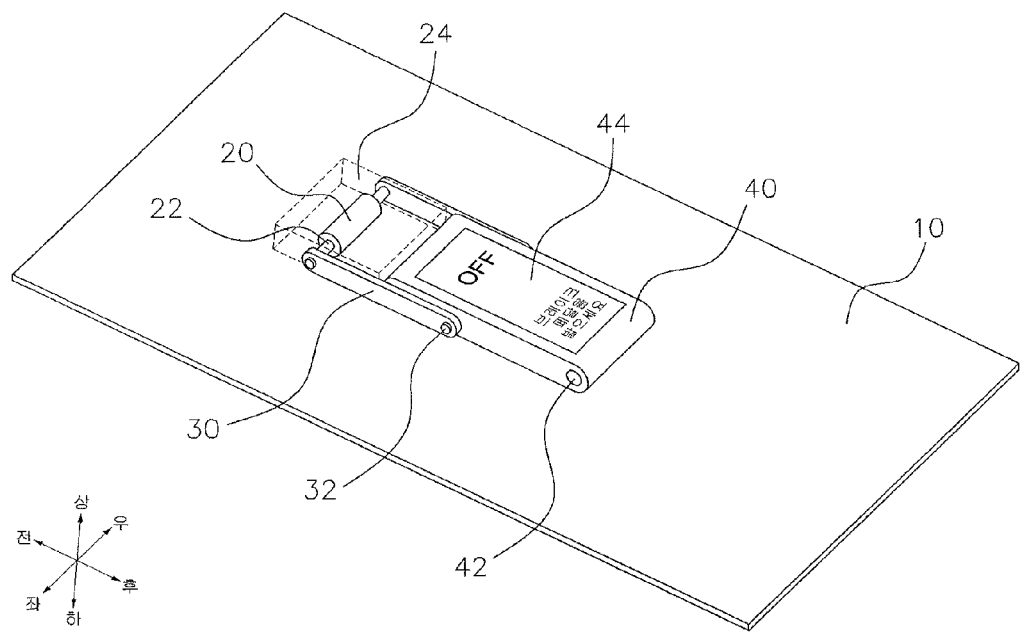
FIG. 2 is a perspective view illustrating an appearance of an exemplary organ type electronic shift lever according to the present invention.

As illustrated in FIG. 2, the step motor 20 is laterally coupled in a motor case 24 attached on the console surface 10, and the motor rotation shafts 22 are coupled to both ends of the step motor 20 and protrude to the outside of the motor case 24.

The step motor 20 may be electrically connected to a motor control unit so as to be rotated depending on an electric signal transmitted from the motor control unit, and may be rotated when a driver in the vehicle directly moves the shift lever 40, as will be described below.

The pair of lever arms 30, which is formed to be elongated in a longitudinal direction thereof, is coupled to the motor rotation shafts 22 so as to be rotated about the motor rotation shafts 22, and the lever arms 30 are rotated when the step motor 20 is rotated depending on an electric signal or when the driver moves the shift lever 40 forward and rearward.

The lever pins 32 are rotatably coupled to the other ends of the lever arms 30, respectively, and the lever arms 30 and the shift lever 40 are connected with each other by the lever pins 32.

In the illustrated exemplary embodiment, the shift lever 40 is formed in a rectangular parallelepiped shape, and particularly, a rear end portion of the shift lever 40 is a portion that is in direct contact with the console surface 10, and may be rounded. However, the present invention is not limited thereto.

The magnetic unit 42, which is formed to be laterally elongated, is coupled in the rear end of the shift lever 40, and the display unit 44 is formed on an upper surface of the shift lever 40 so as to display a current state of the gear shift stage, a current state of the vehicle, various warning messages, or the like.

Figure 3:
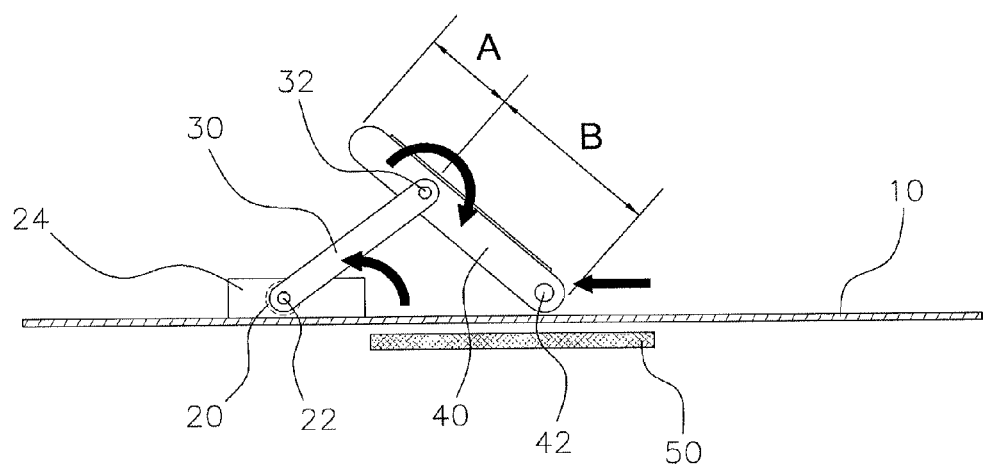
FIG. 3 is a side view illustrating an appearance of an exemplary organ type electronic shift lever according to the present invention.

As illustrated in FIG. 3, the recognition sensor 50, which interacts with the magnetic unit 42 so as to sense a variation in position of the magnetic unit 42, is formed below the console surface 10, and the recognition sensor 50 has an iron plate or the like therein such that the magnetic unit 42 serves as a balancing weight for the shift lever 40 so as to prevent the shift lever 40 from being lifted upward.

The inclination angle formed between the shift lever 40 and the console surface 10 includes a P-stage inclination angle which is an inclination angle formed between the shift lever 40 and the console surface 10 when the gear shift stage of the vehicle is a P-stage, an R-stage inclination angle which is an inclination angle formed between the shift lever 40 and the console surface 10 when the gear shift stage of the vehicle is an R-stage, an N-stage inclination angle which is an inclination angle formed between the shift lever 40 and the console surface 10 when the gear shift stage of the vehicle is an N-stage, and a D-stage inclination angle which is an inclination angle formed between the shift lever 40 and the console surface 10 when the gear shift stage of the vehicle is a D-stage. The R-stage inclination angle is smaller than the P-stage inclination angle, the N-stage inclination angle is smaller than the R-stage inclination angle, and the D-stage inclination angle is smaller than the N-stage inclination angle.

That is, the P-stage inclination angle has the largest angle, and when the driver pulls the shift lever 40 rearward so that the gear shift stage of the vehicle is changed in the order of the R-stage, the N-stage, and the D-stage, the inclination angle between the shift lever 40 and the console surface 10 becomes gradually smaller while being changed in the order of the R-stage inclination angle, the N-stage inclination angle, and the D-stage inclination angle.

On the contrary, when the driver pushes the shift lever 40 forward such that the gear shift stage of the vehicle is changed in the order of the D-stage, the N-stage, the R-stage, and the P-stage, the inclination angle between the shift lever 40 and the console surface 10 becomes gradually greater while being changed in the order of the D-stage inclination angle, the N-stage inclination angle, the R-stage inclination angle, and the P-stage inclination angle.

As illustrated in FIG. 3, a distance B from the lever pin to the rear end of the shift lever is longer than a distance A from the lever pin to a front end of the shift lever, that is, a weight of part B is greater than a weight of part A, such that the shift lever 40 is prevented from being entirely lifted upward, and moved forward while being rotated clockwise about the lever pin 32.

That is, the shift lever 40 greatly tends to be rotated clockwise in the illustrated exemplary embodiment by its own weight as part B becomes longer and part A becomes shorter, but the lever pin 32 may be variously positioned depending on a type of vehicle, an inclination angle reference of the shift lever, an overall shape of the electronic shift lever, and the like.

Figure 5:
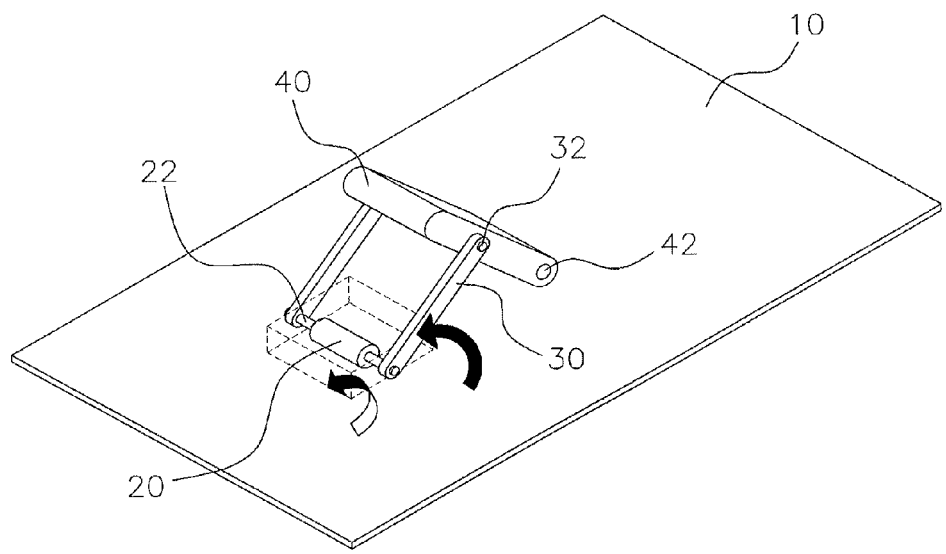
FIG. 5 is a perspective view illustrating an appearance in which an exemplary organ type electronic shift lever according to the present invention is popped up at the time of starting an engine of a vehicle.

As illustrated in FIG. 5, when an engine of the vehicle is started, the shift lever 40 is moved forward by rotation of the motor rotation shafts 22 connected to the step motor 20 while forming a predetermined inclination angle with the console surface 10, that is, forming an inclination angle that corresponds to the P-stage.

That is, when the engine of the vehicle is started, a predetermined signal is transmitted to the motor control unit, the motor control unit transmits the signal to the step motor 20 so as to rotate the motor rotation shafts 22 counterclockwise, and the lever arms 30 connected to the motor rotation shafts 22 are also rotated counterclockwise so that the shift lever 40 is popped up while forming a predetermined inclination angle with the console surface 10.

Figure 8:
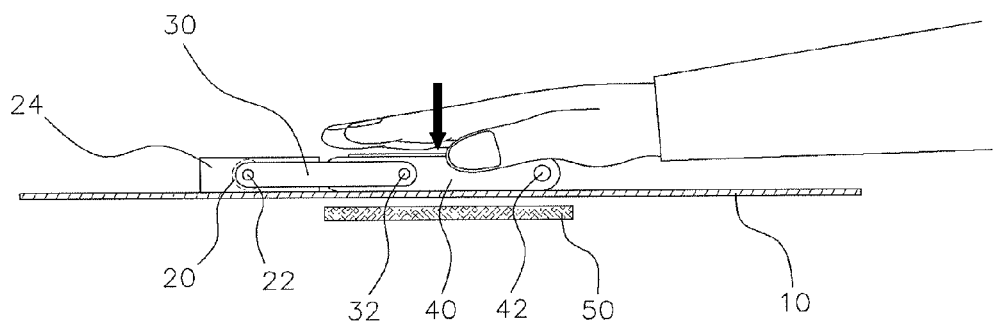
FIG. 8 is a side view illustrating an appearance in which an exemplary organ type electronic shift lever according to the present invention is pressed down at the time of turning off the engine of the vehicle.

As illustrated in FIG. 8, when the driver moves the shift lever 40 by a predetermined length and maintains the shift lever 40 to be in parallel with the console surface 10 for a predetermined time, the engine of the vehicle is turned off.

That is, when the driver presses down the shift lever 40, the lever arm 30 and the motor rotation shafts 22 connected to the lever arms 30 are rotated clockwise, and a predetermined signal is created depending on the operations of the motor rotation shafts 22 by the motor control unit connected to the step motor 20, and as a result, the engine of the vehicle is turned off.

When the shift lever 40 is pressed down, the shift lever 40 needs to be continuously down for a predetermined time, for example, for three seconds or more, in consideration of a malfunction that is not intended by the driver, and in a case in which the driver takes the driver's hand off the shift lever 40 within a predetermined time, the shift lever 40 returns back to the previous state.

In order to prevent the engine of the vehicle from being suddenly turned off in a state in which the vehicle is driven, that is, in a state in which the gear shift stage is the D-stage, the engine of the vehicle is turned off in a case in which the shift lever 40 is moved by a predetermined length, that is, in a case in which the shift lever 40 is moved from a position of the shift lever 40, which corresponds to a stop stage such as the P-stage, the N-stage, or the like, to a rearmost position of the shift lever 40 which corresponds to an engine off stage. When the shift lever 40 is popped down in a case in which the gear shift stage is not the stop stage such as the P-stage, the N-stage, or the like, the shift lever 40 returns back to the previous state.

Figure 4:
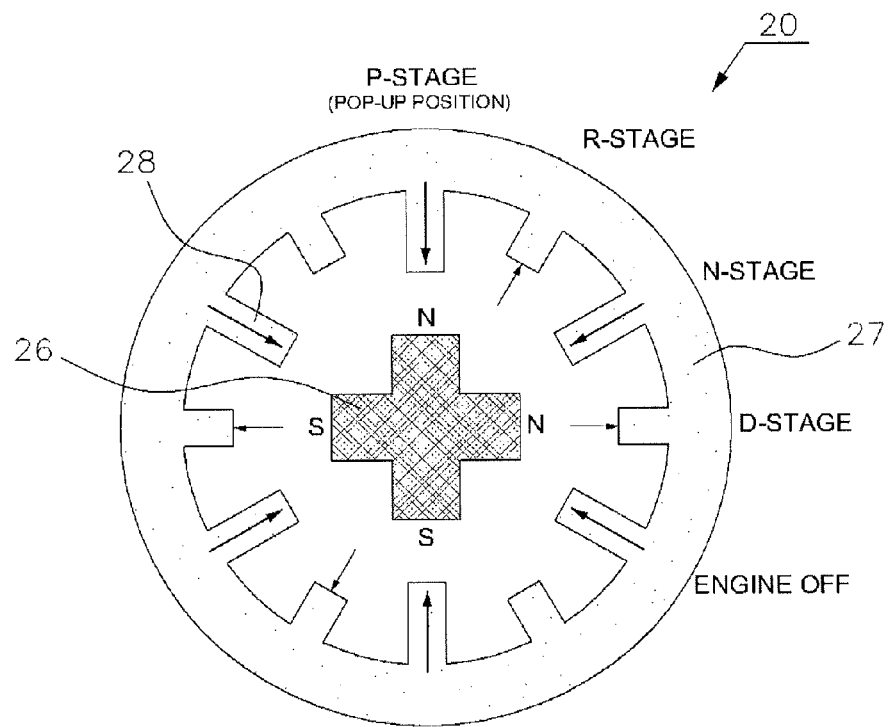
FIG. 4 is a cross-sectional view illustrating an internal appearance of an exemplary step motor according to the present invention.

As illustrated in FIG. 4, the step motor 20 includes: a rotor 26 which is disposed at a center or a center portion of the step motor 20, connected with the motor rotation shafts 22, and formed of permanent magnets; and a stator 27 which is disposed outside the rotor 26, and has a plurality of protruded or curved portions 28 that protrudes in a direction toward the center of the step motor 20.

Specifically, the rotor 26 is disposed at the center of the step motor 20 and formed of permanent magnets having N poles and S poles, and the stator 27 is formed of cores which are disposed in a circular or substantially circular shape outside the rotor 26 and each have a coil wound thereon.

Therefore, when the driver moves the shift lever 40 forward and rearward, the motor rotation shafts 22 are rotated by the shift lever 40, the rotor 26 connected to the motor rotation shafts 22 is rotated, and the rotor 26 passes over the curved portions 28 of the stator 27 while being rotated. In this case, a variation in torque occurs as a distance between the rotor 26 and the stator 27 is varied, and this variation is called cogging torque.

When the motor rotation shafts are rotated by the cogging torque as described above, the step motor 20 is not uniformly rotated while slightly generating knock sound instead of being rotated smoothly, and as a result, the driver feels feeling of moderation when moving the shift lever 40.

The curved portions 28 of the stator 27 protrude in a direction toward the center of the step motor 20, that is, in a direction toward the rotor 26, and heights at which the curved portions 28 protrude are formed to be different from each other, thereby implementing different manipulation force when the driver manipulates the shift lever 40.

In the illustrated exemplary embodiment, the heights at which the curved portions 28 protrude, which correspond to the P-stage, the N-stage, and the engine off stage, are greater than the heights at which the curved portions 28 protrude, which correspond to the R-stage and the D-stage. Accordingly, when the driver changes the gear shift stage to the P-stage, the N-stage and the engine off stage, relatively greater torque needs to be applied to the step motor 20 through the shift lever 40 in order to change the gear shift stage.

Circular rotatable rollers may be further coupled to both side surfaces of the rear end of the shift lever 40, and guides, which slidably accommodate the rollers in a longitudinal direction of the guides, may be formed on the console surface 10.

As described above, the rollers and the guides are further provided, thereby more surely preventing the shift lever 40 from being lifted up in addition to an effect of preventing the shift lever 40 from being lifted up using the weight of the shift lever and the magnetic unit 42.

An operational process of the organ type electronic shift lever according to various exemplary embodiments of the present invention will be described below.

As illustrated in FIG. 5, when the driver starts the engine of the vehicle, an electric signal is transmitted to the step motor 20, the motor rotation shafts 22 of the step motor 20 are rotated counterclockwise, and the lever arms 30 are rotated counterclockwise by the rotation of the motor rotation shafts 22.

The shift lever 40 is popped up by the rotation of the lever arms 30 and moved forward to a position corresponding to the P-stage while forming a predetermined inclination angle with the console surface 10, and the driver prepares to change the gear shift stage of the vehicle by manipulating the popped up shift lever 40.

Figure 6:
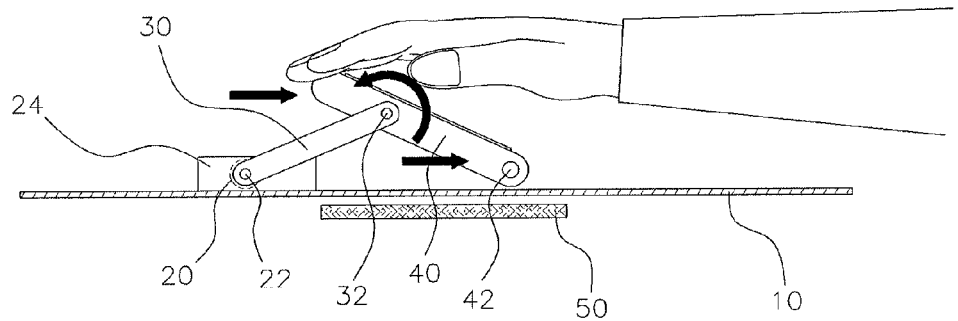
FIG. 6 is a side view illustrating an appearance in which an exemplary organ type electronic shift lever according to the present invention is operated rearward at the time of driving the vehicle.

As illustrated in FIG. 6, when the driver pulls rearward the shift lever 40 that is popped up by the rotation of the step motor 20, the lever arms 30 are rotated clockwise, the motor rotation shafts 22 are rotated clockwise by the rotation of the lever arms 30, and the rotor 26 connected to the motor rotation shafts 22 is also rotated clockwise.

Therefore, as the rotor 26 is rotated while overcoming the cogging torque of the stator 27, the driver feels feeling of moderation, and the recognition sensor 50 senses the position of the magnetic unit 42 positioned at the rear end of the shift lever 40 and recognizes the current gear shift stage of the vehicle.

Figure 7:
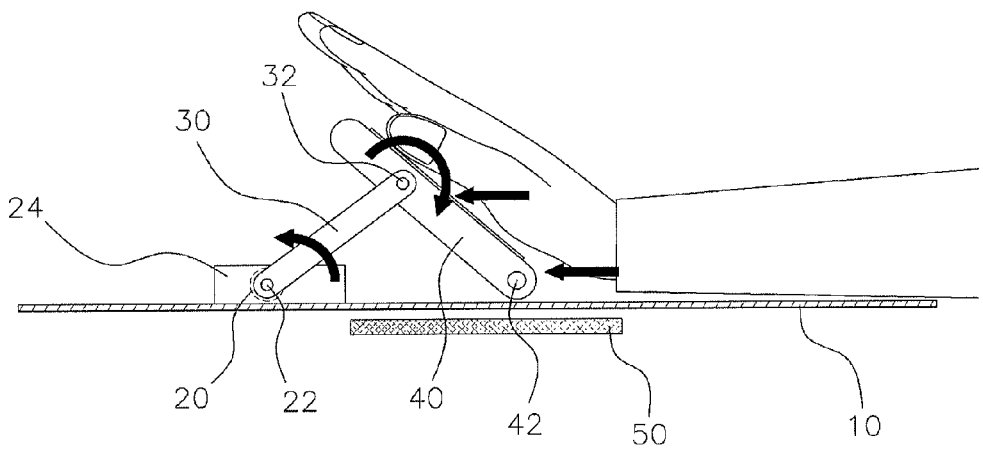
FIG. 7 is a side view illustrating an appearance in which an exemplary organ type electronic shift lever according to the present invention is operated forward at the time of driving the vehicle.

On the contrary, as illustrated in FIG. 7, when the driver pushes the shift lever 40 forward, the lever arms 30, the motor rotation shafts 22 and the rotor 26 are rotated counterclockwise, and in this case, the recognition sensor 50 senses the position of the magnetic unit 42 and recognizes the current gear shift stage of the vehicle.

As illustrated in FIG. 8, the driver may change the shift lever 40 to the P-stage or the N-stage, and then turn off the engine of the vehicle by pushing an engine start button, but the driver may turn off the engine of the vehicle by pressing down the shift lever 40.

In this case, it may be configured that in consideration of an incorrect manipulation of the driver, the shift lever 40 needs to be moved by a predetermined length, that is, the shift lever 40 needs to be moved from a position corresponding to the P-stage or the N-stage to a position where the shift lever 40 is pressed down, and the shift lever 40 needs to be maintained in the down state for a predetermined time, that is, for several seconds, in order to turn off the engine of the vehicle.

For convenience in explanation and accurate definition in the appended claims, the terms "upper" or "lower", "front" or "rear", "forward" or "rearward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An organ type electronic shift lever which is formed on a console surface disposed at a periphery of a driver seat in a vehicle, the electronic shift lever comprising:
 a step motor which is coupled to the console surface and has both ends to which motor rotation shafts are connected;
 a pair of lever arms each of which has one end coupled to one or each of the motor rotation shafts so that the pair of lever arms is rotatable about the motor rotation shafts;
 a pair of lever pins each of which is rotatably coupled to the other end of one or each of the lever arms;
 a shift lever which has side portions rotatably connected to the lever arms by the lever pins, and a rear end to which a magnetic unit is coupled;
 a display unit which is formed on one surface of the shift lever; and
 a recognition sensor which is formed in the console surface in a longitudinal direction thereof, and senses a position of the magnetic unit,
 wherein when the shift lever is moved forward or rearward while forming an inclination angle with respect to the console surface, a gear shift stage of the vehicle is changed.

2. The organ type electronic shift lever of claim 1, wherein the inclination angle formed between the shift lever and the console surface includes:
 a P-stage inclination angle which is an inclination angle formed between the shift lever and the console surface when the gear shift stage of the vehicle is a P-stage;
 an R-stage inclination angle which is an inclination angle formed between the shift lever and the console surface when the gear shift stage of the vehicle is an R-stage;
 an N-stage inclination angle which is an inclination angle formed between the shift lever and the console surface when the gear shift stage of the vehicle is an N-stage; and
 a D-stage inclination angle which is an inclination angle formed between the shift lever and the console surface when the gear shift stage of the vehicle is a D-stage,
 wherein the R-stage inclination angle is smaller than the P-stage inclination angle, the N-stage inclination angle is smaller than the R-stage inclination angle, and the D-stage inclination angle is smaller than the N-stage inclination angle.

3. The organ type electronic shift lever of claim 2, wherein when an engine of the vehicle is started, the shift lever is moved forward by rotation of the motor rotation shafts connected to the step motor while forming the P-stage inclination angle with respect to the console surface.

4. The organ type electronic shift lever of claim 2, further comprising:
 an engine off stage inclination angle when the shift lever is moved rearward by a predetermined length and disposed in parallel with the console surface,
 wherein when the shift lever maintains the engine off stage inclination angle with respect to the console surface for a predetermined time, the engine of the vehicle is turned off.

5. The organ type electronic shift lever of claim 4, wherein when the inclination angle is changed to the engine off stage inclination angle in a state in which the shift lever forms the P-stage inclination angle or the N-stage inclination angle with respect to the console surface, and the engine off stage inclination angle is maintained for the predetermined time, the engine of the vehicle is turned off, and when the inclination angle is changed to the engine off stage inclination angle in a state in which the shift lever forms the R-stage inclination angle or the D-stage inclination angle with respect to the console surface, the inclination angle returns back to the R-stage inclination angle or the D-stage inclination angle, respectively.

6. The organ type electronic shift lever of claim 1, wherein a distance from the lever pin to the rear end of the shift lever is longer than a distance from the lever pin to a front end of the shift lever.

7. The organ type electronic shift lever of claim 1, wherein the step motor includes:
 a rotor which is disposed at a center of the step motor, connected with the motor rotation shafts, and formed of a permanent magnet; and
 a stator which is disposed outside the rotor, and has a plurality of protruded portions that protrudes in a direction toward the center of the step motor, and
 when the shift lever is moved and the motor rotation shafts are rotated, a distance between the rotor and the stator is varied, such that cogging torque is generated, and feeling of moderation is created.

8. The organ type electronic shift lever of claim 7, wherein the protruded portions are formed to have different heights from each other so that the generated cogging torque is different and in accord with the gear shift stage of the vehicle.

9. The organ type electronic shift lever of claim 1, further comprising:
 rollers which are rotatably coupled to both sides of the rear end of the shift lever; and
 guides which are formed on the console surface in the longitudinal direction thereof and slidably accommodates the rollers.

* * * * *